United States Patent [19]

Walker

[11] Patent Number: 4,694,387

[45] Date of Patent: Sep. 15, 1987

[54] INDUCTIVE DEVICES

[75] Inventor: Charles S. Walker, King County, Wash.

[73] Assignee: Honeywell, Inc., Minneapolis, Minn.

[21] Appl. No.: 1,610

[22] Filed: Jan. 8, 1987

[51] Int. Cl.[4] .......................................... H02H 7/122
[52] U.S. Cl. ..................................... 363/56; 363/133; 361/11; 361/58
[58] Field of Search .................... 363/24–26, 363/56, 97, 133–134; 361/11, 58, 111, 118

[56] References Cited

U.S. PATENT DOCUMENTS

| | | | |
|---|---|---|---|
| 2,594,890 | 4/1952 | Ellwood | 361/11 |
| 3,831,078 | 8/1974 | Peil | 363/25 X |
| 4,190,883 | 2/1980 | Cowett, Jr. | 363/26 |
| 4,275,430 | 6/1981 | Seki et al. | 363/50 X |
| 4,323,840 | 4/1982 | Gawler | 363/56 X |
| 4,328,538 | 5/1982 | Pollmeier | 363/56 |
| 4,489,370 | 12/1984 | Migliori | 363/26 |

Primary Examiner—Peter S. Wong
Attorney, Agent, or Firm—C. Lamont Whitham; Roger W. Jensen

[57] ABSTRACT

An inductive device composed of a bead (10) of magnetic material, such as ferrite, has an aperture through which an electrical conductor (13) is adapted to pass and a reset winding (14) wound thereon and connected to a source of constant current. The constant reset current resets the bead of magnetic material so that the maximum volt-second absorbtion capability of the bead is available for preventing destructively high current spikes from flowing through the electrical conductor. The inductive device is advantageously used in the d.c. supply of the power transistors (101 and 102) of an inverter (100) to protect the transistors from current surges due to the simultaneous conduction of the transistors.

5 Claims, 4 Drawing Figures

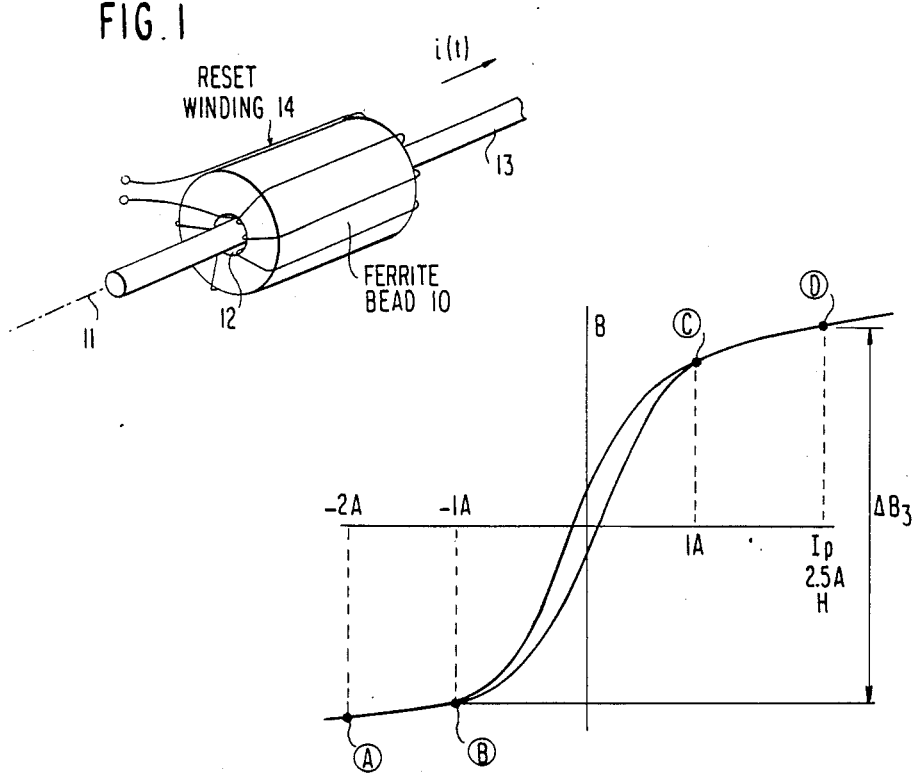
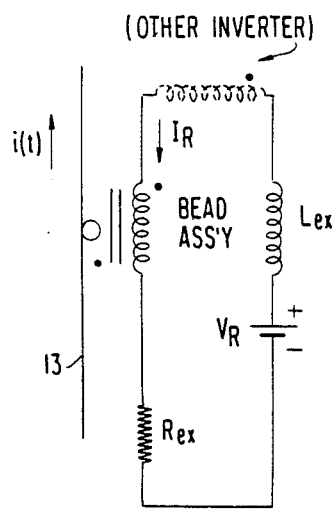

INDUCTIVE DEVICES

BACKGROUND OF THE INVENTION

1. Field of the Invention

This invention generally relates to the field of electrical engineering and, more particularly, to an arrangement for protecting power transistors from being damaged by inadvertant improper operation of circuitry controlling the transistors.

2. Description of the Prior Art

It is known that if conductors subject to power surges are passed through beads of magnetic material, the beads are capable of absorbing short pulses of energy thereby protecting electrical components connected to the conductors. This principle is taught, for example, in U.S. Pat. No. 2,594,890 to Ellwood issued Apr. 29, 1952. Ellwood discloses ferrite beads strung on a wire for the purpose of protecting electrical contacts from deleterious erosion caused by electrical arcing and/or energy dissipation during contact operation. In the Ellwood circuit, a reed switch is connected in series and controls a relay coil. When the reed switch is closed, a d.c. current flows in the circuit, and when the reed switch is opened, the relay coil inductance produces whatever voltage is necessary to maintain the current flow. This results in an arc being created across the reed switch contacts. In order to protect the reed switch contacts from arcing, Ellwood places three ferrite beads on the conductor between the reed switch and the relay coil. However, the protection afforded by these beads decreases if the material of the beads approaches saturation. In the Ellwood circuit, the d.c. current which flows when the reed switch is closed biases the beads towards saturation, and this is apparently the reason that Ellwood uses three beads to provide the requisite protection for the reed switch contacts.

Also known in the prior art are reset circuits for saturable reactors. U.S. Pat. No. 4,275,430 to Seki et al. issued June 23, 1981, discloses a snubber circuit connected between the anode and cathode of a gate turn-off (GTO) thyristor. A saturable reactor is connected in series to the GTO thyristor. A gate off signal is supplied to the gate of the GTO thyristor and to the saturable reactor as a backward current to reset the saturable reactor.

U.S. Pat. No. 4,323,840 to Gawler issued Apr. 6, 1982, discloses a switching mode regulator which is improved in transient performance by the addition of a current transformer which aids in storing energy from the turn-on transient. The current transformer prevents large currents due to finite recovery time of a flyback diode. By using a capacitor with the transformer, energy is returned to the load in a manner which reduces the time rate of change of voltage applied to the switch at turn-off.

SUMMARY OF THE INVENTION

It is therefore an object of the subject invention to provide a technique of electrical circuit component protection which minimizes the number of devices used.

It is another and more specific object of the invention to provide a means for protecting circuit components such as power transistors from power surges.

It is a further object of the present invention to employ ferrite beads which may be reset to efficiently absorb short pulses of energy.

According to the present invention, the volt-second absorption capability of a ferrite bead is increased by adding a reset winding to the bead. A reset voltage is used to set the bead flux density at a point where a very large change in flux density is available to absorb volt-seconds. The invention is particularly advantageous in a power inverter circuit for protecting power MOSFETs. The use of the reset winding makes all of the bead volt-second absorbtion capability available and prevents destructively high current spikes in the power transistors in the event that they are simultaneously on.

BRIEF DESCRIPTION OF THE DRAWINGS

The foregoing and other objects, aspects and advantages of the invention will be better understood from the following detailed description of the invention with reference to the drawings, in which:

FIG. 1 is a perspective view of a ferrite bead on a conductor with a reset winding wound on the bead according to the invention;

FIG. 2 is a graph of the hysteresis curve of the ferrite bead shown in FIG. 1;

FIG. 3 is a simplified schematic diagram of the equivalent circuit of FIG. 1.

DETAILED DESCRIPTION OF THE PREFERRED EMBODIMENT OF THE INVENTION

Figure 4:
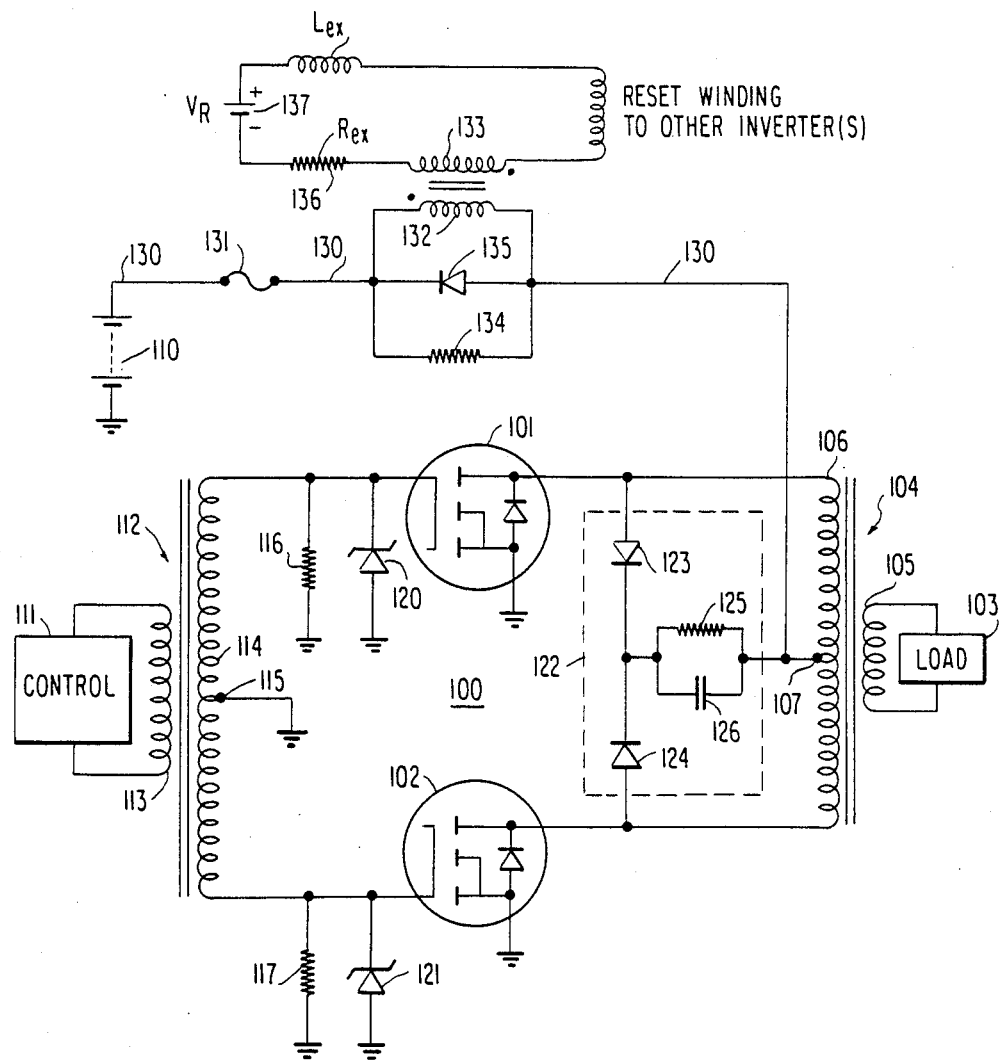
FIG. 4 is a schematic diagram of a circuit illustrative of the use of the invention.

Referring now to the drawings, and more particularly to FIG. 1, an induction device according to the invention is shown as comprising a "bead" or generally cylindrical body 10 of magnetically permeable material, such as ferrite. The bead is symmetrical about a central axis 11 and has an axial aperture 12 through which an insulated wire or conductor 13 passes. A reset winding 14 is wound on the bead 10 and comprises several turns of wire which passes through the aperture 12 and about the body of the bead.

FIG. 2 is a graph showing a typical hysteresis curve for a ferrite bead of the type shown in FIG. 1. As shown in FIG. 2, the reset winding 14 is used to set the bead flux density at point A. This is actually two ampere turns. Hence, a reset winding consisting of ten turns needs only 0.2 amps to set the bead at point A. If i(t) is assumed to be one ampere, positive, this moves the bead flux density to point B. When a current spike occurs on conductor 13, as when the power transistors of a power inverter are simultaneously on, $\Delta B_3$ is now available to absorb volt-seconds.

FIG. 3 is a simplified schematic diagram of the equivalent circuit of the invention showing how the invention is used. The reset current, $I_R$, is provided by voltage $V_R$ and limited by the resistor $R_{ex}$. The current i(t) which flows in conductor 13 supplies the power transistors in, for example, a power inverter. It is possible to protect other inverters using the same current limiting resistor $R_{ex}$ and reset voltage $V_R$ as indicated in FIG. 3. If this is done, it may be necessary to "decouple" the inverters with a decoupling inductor $L_{ex}$.

Referring to FIG. 4, there is shown a power inverter 100 having a pair of MOSFETs 101 and 102 that provide an alternating voltage to a load 103 through a power transformer 104. The transformer 104 has a secondary winding 105, to which the load 103 is connected, and a primary winding 106 having a center tap 107 connected to a direct current source 110. The transistors 101 and 102 are controlled by solid state clock or other control means 111 through a driver transformer 112. The transformer 112 has a primary winding 113, to which the control means 111 is connected, and a secondary winding 114 having a grounded center tap 115. The circuit includes the usual biasing resistors 116 and 117 connected to the gates of power transistors 101 and 102, respectively, as well as over-voltage protection diodes 120 and 121 connected across the gate and source electodes of the power transistors 101 and 102, respectively. Additionally, there is provided a snubber circuit 122 connected across the primary winding 106 of power transformer 104 which comprises diodes 123 and 124 having their cathodes connected through the RC circuit composed of resistor 125 and capacitor 126 to the center tap 107.

The d.c. power source 110 is connected to the center tap 107 of the power transformer 104 by a conductor 130. This conductor may be fused as indicated at 131. The conductor 130 passes through a ferrite bead 132 having a reset winding 133 according to the invention. The reset winding 133 is in the loop circuit described with respect to FIG. 3 of the drawings. This loop circuit includes the current limiting resistor 136 and the reset voltage, $V_R$, source 137. Connected across the bead 132 is a resistor 134 and a diode 135.

In the event that both transistors 101 and 102 simultaneously conduct, as when one begins conducting before the other is fully turned off, there is a tendency for a large current surge to be supplied to the sources of the transistors. This current surge, however, is absorbed by the ferrite bead 132. This is best understood by again referring to FIG. 2 of the drawings. The reset current that flows through the reset winding 133 is continuous with no switching because timing of the reset signal is not necessary. With no current flowing through either of the power transistors 101 or 102, the ferrite bead flux density will be at point A. As the current through either one of the transistors increases, the flux density will move toward point B. If both the power transistors happened to be turned on at the same time, large currents would result. However, the ferrite bead "holds off" the power supply surge. The core operation point moves toward point D and, in the case illustrated, limits the peak transistor current to 2+2.5 or 4.5 amperes. This could be further improved by passing a sufficiently strong reset current through the reset winding 133 to prevent the bead from starting to saturate at the beginning of conduction of one of the power transistors so that the operation ended up at point C rather than point D. In this case the peak current would only be 2+1 or 3 amperes. On the other hand, without the reset current, the bead would begin to saturate almost immediately thereby severely limiting the volt-second abasorbtion capability of the bead.

While the invention has been described in terms of a singel preferred embodiment and its application has been described with respect to one specific type of circuit, those skilled in the art will understand that the invention can be practiced with modification and alteration in other and different environments without departing from the scope of the appended claims.

Having thus described my invention, what I claim as new and desire to secure by Letters Patent is as follows:

1. An inductive device for protecting one or more transistors in a power supply composed of a bead of magnetic material, said bead being formed with an axial aperture through which an electrical conductor electrically connected to electrodes of the transistors is adapted to pass, and a reset winding wound on said bead and connected to a source of constant current for resetting said inductive device so that the maximum volt-second absorbtion capability of said inductive device is available for preventing destructively high current spikes from flowing through said electrical conductor.

2. An inductive device as recited in claim 1 wherein said source of constant current includes a current limiting resistor and a source of d.c. voltage connected in series with said reset winding.

3. An inductive device as recited in claim 2 wherein said current limiting resistor and said source of d.c. voltage are connected to one or more other reset windings of similar inductive devices.

4. An inverter circuit comprising:
a pair of power transistors;
a power transformer having a primary winding and a secondary winding, said primary winding being connected to said power transistors and having a center tap;
a load connected to said secondary winding;
a source of d.c. current connected by an electrical conductor to said center tap; and
an inductive device composed of a bead of magnetic material having an aperture through which said electrical conductor passes, and a reset winding wound on said bead and connected to a second source of d.c. current for resetting said inductive device so that the maximum volt-second absorbtion capability of said inductiYe device is available for preventing destructively high current spikes from flowing through said electrical conductor to said pair of power transistors.

5. The inverter circuit recited in claim 4 wherein said second source of d.c. current includes a current limiting resistor and a source of d.c. voltage connected in series with said reset winding.

* * * * *